April 18, 1939.  A. M. WOLF  2,155,287

VEHICLE

Filed Sept. 25, 1935  5 Sheets-Sheet 1

INVENTOR

Austin M. Wolf

Fig. 7.

Patented Apr. 18, 1939

2,155,287

UNITED STATES PATENT OFFICE 2,155,287

VEHICLE

Austin M. Wolf, Plainfield, N. J.

Application September 25, 1935, Serial No. 41,958

9 Claims. (Cl. 180—54)

This invention relates to motor vehicles and has for one of its objects to provide a simple and compact arrangement of the motor transmission mechanism and clutch in combination with an accessory, such as a compressor, having driving connection between the clutch and transmission, and means responsive to clutch operation for rendering said accessory functionally ineffective.

It is another object of the invention to provide a cooling system in which the radiator is positioned in parallel relation with the motor crank shaft and an air circulating fan associated therewith and having driving connection with one end of the crank shaft, while a second fan has a driving connection with the other end of the crank shaft and operates to create a circulation of air longitudinally of the motor.

The invention in one of its embodiments relates in particular to dual powered motor buses in which a common radiator is provided for a pair of prime movers, together with means operatively connected with each of the prime movers for circulating air through said radiator.

Another object of the invention is to provide a power transmission means which is common to both of the prime movers having a single power input shaft and an air circulating fan coupled to one end of said shaft.

Still further objects of the invention will appear as a description thereof proceeds, with reference to accompanying drawings in which:

Fig. 2 is a side elevation thereof.

Figure 1:
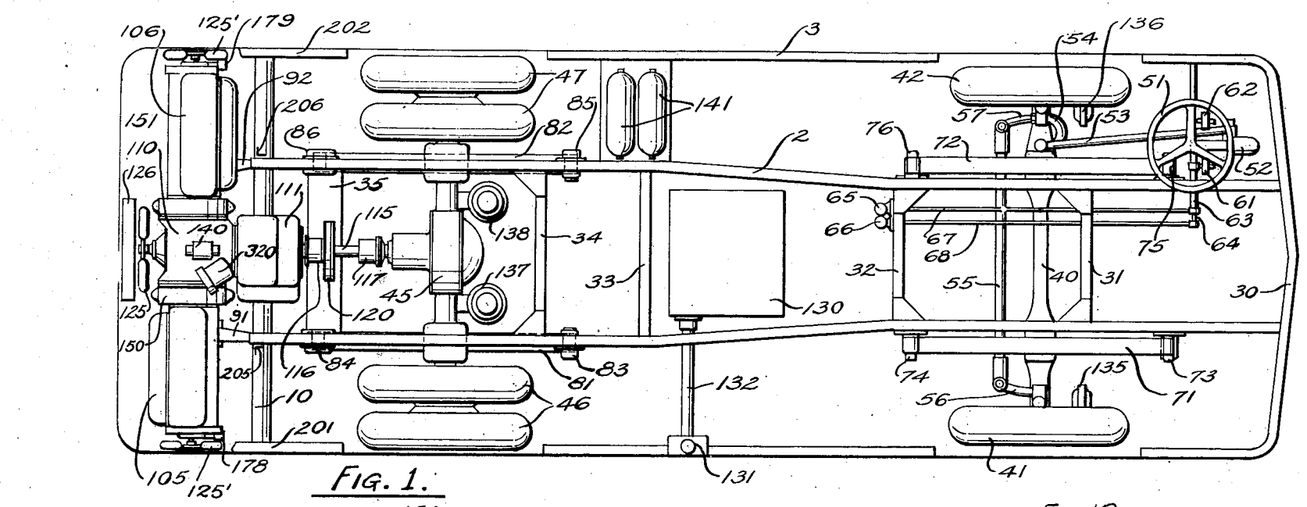
Fig. 1 is a plan view showing the general disposition of the elements comprising the vehicle.

Referring to Figs. 1 and 2 the vehicle illustrated is that of a bus in which the chassis frame and body frame are combined into the unitary structure. The main rail members 1 and 2 form a foundation for the body structure 3 by means of cross channels 5, 6, 7, 8, 9 and 10. There are other supporting members, not shown, to support the body, particularly the portion to the rear of cross member 10 in which a partial cantilever effect is obtained for the overhanging portion of the body which is furthermore braced in position by that portion to the rear of door 15 by means of the vertical posts 16, the roof structure 17 and the belt rail 18.

A front door 25 is located ahead of the front wheel house 26 and the door 15 is shown ahead of the rear wheel house 27.

The main rails 1 and 2 are tied together by the front cross member 30 and the cross members 31, 32, 33, 34 and 35. The front axle 40 is provided with the wheels 41 and 42. The driving axle 45 is provided with the dual wheel 46 and 47.

Above cross members 6, 7, 8 and 9 is located the flooring 50. At the forward end of same is located the driver's seat, not shown, behind the steering wheel 51. The steering gear mechanism within the housing 52 actuates the drag link 53 which is attached to the steering arm 54 on the front axle 40. The cross tie rod 55 connects the arms 56 and 57 to the front wheel spindles.

The forward end of flooring 50 is extended in the form of a ramp or toe board 60 which acts as a support for the driver's feet and through which extend pedals 61 and 62, these being the brake and clutch pedals respectively. They are mounted on tube 63 and shaft 64 which are properly mounted on the frame structure. They actuate the control valves 65 and 66 through the intermediary of rods 67 and 68. The control valves 65 and 66 are shown mounted on cross member 32 and their function will be described later.

The front axle 40 takes the forward body load through the front springs 71 and 72 which are held to the frame by brackets 73, 74, 75, 76, brackets 73 and 75 taking the eyes of the springs directly, whereas brackets 74 and 76 connect the springs to the frame through the customary shackle connection.

The driving axle 45 takes the rear portion of the body load by means of springs 81 and 82. Brackets 83 and 84 transfer the frame load to spring 81 and brackets 85 and 86 transfer the load to spring 82. Brackets 83 and 85 take the eye ends of the rear springs, whereas brackets 84 and 86 are of the slipper type and take the open ends of the rear springs. It will be noted that the main rails 1 and 2 have a kick-up over the driving axle and sweep downward toward the rear terminating at the brackets 91 and 92, the latter forming the extension of the main rails to act as a power plant support.

Rearwardly of door 15 the floor 50 continues in the ramp section 95 in order to provide riding clearance for the driving axle and continues to the rear of same in the horizontal floor portion 96. The rear seat cushion 98 and the seat back 99 are located over the box 100 which houses the engine or engines. This box has a vertical wall 101 and the top wall 102. These walls together with the wall 103 hermetically seal the engine compartment from the interior of the vehicle, to prevent any ingress of fumes.

The power plant consists of the prime movers 105 and 106 which are united to the transfer case 110. To the latter is secured the transmission 111. Power is conveyed therefrom to driving axle 45 by means of propeller shaft 115 with the slip type universal joint 116 adjacent the transmission and the universal joint 117 adjacent the driving axle. The hand brake disc 120 is located on joint 116.

In axial alignment with the main shaft of transmission 111 is the cooling fan 125 which directs a blast of air rearwardly through the core of the radiator 126. To the outer end of the crank shaft of each of the prime movers 105, 106 a fan 125' is operatively connected for the purpose of creating a continuous circulation of air longitudinally over and around the respective prime movers.

The gasoline tank 130 is located amidships and is provided with the filler 131 which is connected to the tank by means of a flexible tubing 132.

The braking system is of the conventional compressed air type with the actuating diaphragms 135 and 136 on front axle 40 and diaphragms 137 and 138 on the driving axle 45. The compressor 140 is driven by the power plant and air stored in the reservoirs 141. The piping between compressor 140 and the reservoirs 141 is not shown since it is well known in the art as well as the piping from the reservoirs 141 to the control valve 65 from whence piping, not shown, conveys air to the diaphragms 135, 136, 137 and 138.

Figures 3, 3A, 4, 5, 6:
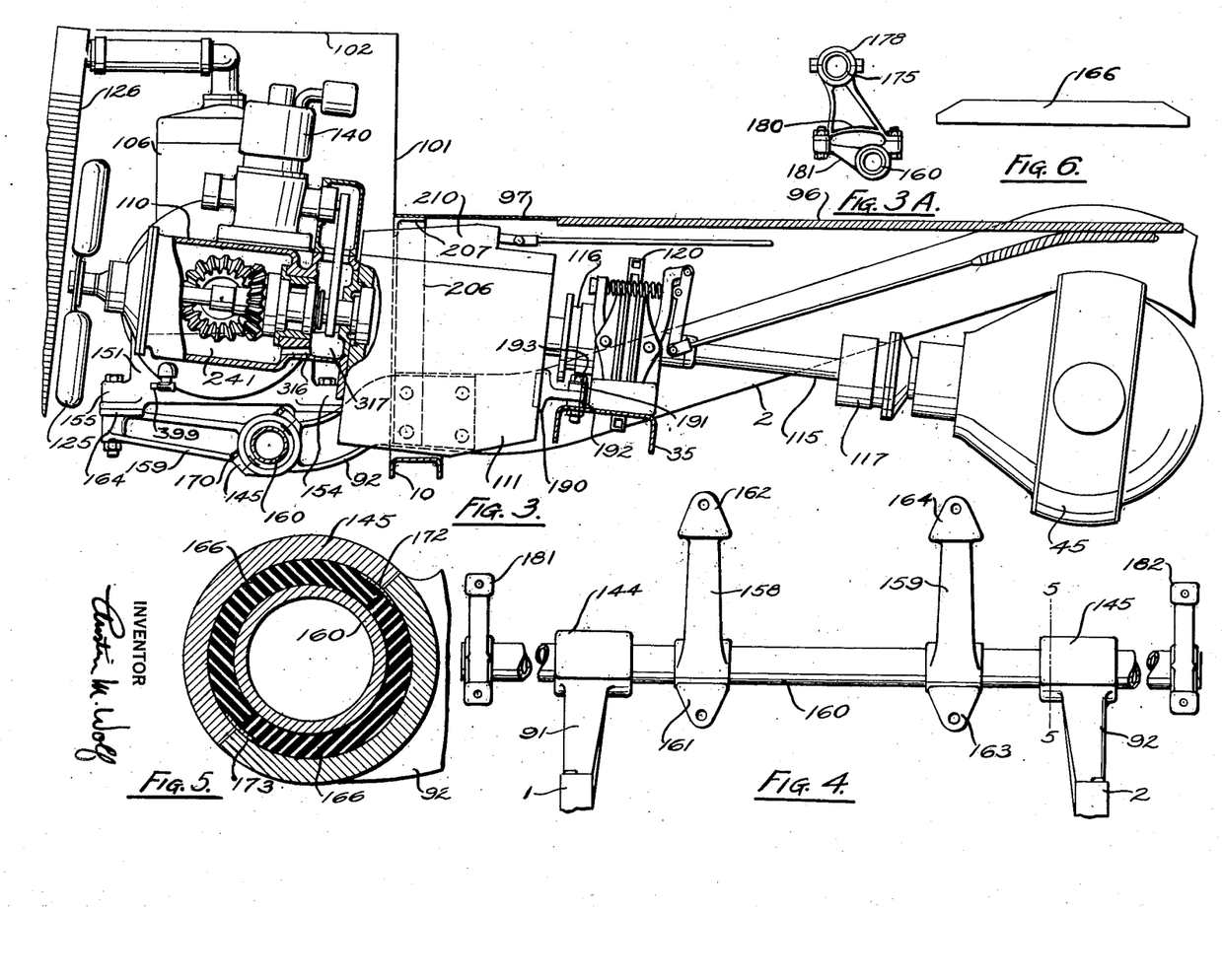
Fig. 3 is an elevation of the power plant, the driving axle and the correlating parts.
Fig. 3A shows the support for the power plant at the trunnion end of the engine.
Figs. 4, 5 and 6 are detailed views showing a portion of the power plant mounting.

Referring to Fig. 3 it will be noted that the frame extension 92 forms one-half of a circular bracket, the other half being the cap 145. Fig. 4 is a plan view of the rear end of rails 1 and 2 showing the extensions 91 and 92 with their caps 144 and 145 respectively. The bell-housings 150 and 151 of engines 105 and 106 are provided on each side with bosses 152, 153 and 154, 155 respectively. Again referring to Figs. 1, 2 3, and 4, the bell-housings 150 and 151 are supported on brackets 158 and 159, the plan view of which is clearly shown in Fig. 4. The bosses 161, 162, 163 and 164 of these brackets take the bosses 152, 153, 154 and 155 of bell-housings 150 and 151 respectively. Brackets 158 and 159 are welded to the cross tube 160. The latter is supported by brackets 91 and 92 through the intermediary of rubber bushings.

Fig. 5 is a section on line 5—5 of Fig. 4 through bracket 92 and its cap 145. Between same and tube 160 are located the rubber walls 166. One such wall is shown in its natural or flat state in Fig. 6. As an example, should it be desired to press the wall to a final thickness of ½" when cap 145 is drawn up tightly to bracket 92, the thickness of the rubber could be made slightly oversize such as ₁⁄₁₆". The extent of the oversize will depend upon the durometer reading of the rubber. In assembling tube 160 in the brackets 91 and 92 a wall of rubber 166 is placed in bracket 92, being curved to conform to the general shape of the bracket. Tube 160 is then laid inside of the rubber, a second wall 166 is laid over tube 160 and curved around the latter by pressing cap 145 as close to bracket 92 as is permissible. The cap screws 170 in Fig. 3 are then drawn up, compressing the rubber walls 166. The length of the wall 166 in Fig. 6 is less than the mean radius of the wall in Fig. 5 in order to allow overflow of the rubber under compression. In the same manner the width of the rubber is slightly less than the width of either bracket 91 or 92 in an axial direction in relation to tube 160. In order to prevent the flow of rubber into the space between cap 146 and bracket 92 as the former is drawn up, the thin metallic shims 172 and 173 are inserted before the compression process. They bridge the gap then existent and as the bracket parts are drawn together they prevent the flow of rubber radially outward.

The starting crank ends of engines 105 and 106 are provided with the customary trunnions 175 and 176 respectively. Brackets 178 and 179 encompass these trunnions and extend downward to form feet 180, as shown in Fig. 3A. The feet rest upon the brackets 181 and 182 which are welded to tube 160 near its extremities. The distance from the center of the engine crankshaft to the face of brackets 181 and 182 is the same as the distance to the horizontal face of the lugs 152 and 153, 154, and 155 of the bell-housings 150 and 151 respectively where they rest upon the brackets 158 and 159. In this manner it is possible to place the brackets 158, 159, 181 and 182 on tube 160 and align their faces on a face-plate after which the welding operation ensues. This insures perfect alignment of the brackets and the proper aligned support of the engines through their outer supports 178 and 179 and their bell-housings 150 and 151.

It will be noted in Figs. 2 and 3 that the tube 160 is not located below the engine crankshaft center but to the right thereof. The center of tube 160 is so located that it is below the center gravity of the complete power plant including engines 105 and 106, the clutches and mechanism within the transfer case 110, transmission 111 and all the power plant auxiliaries. In the case of the use of two engines, as shown in Fig. 1, since the engines are alike and their disposition symmetrical about the longitudinal centre of the vehicle, their centre of gravity would balance at the centre on the crankshaft axis. This leaves the weight of the transmission 111 and universal joint 116 as an overhanging static load in respect to the crankshaft centre. Tube 160 is therefore located under the centre gravity of the entire unit and provides a two point mounting of the entire power plant by means of brackets 91 and 92. When accelerating or decelerating the vehicle there will be a natural tendency of the centre gravity to rotate about the centre of tube 160 and the frictional grip of the rubber mountings in brackets 91 and 92 would be insufficient to limit it. A third point in the suspension of the power plant but which is unloaded under static conditions is the bracket 190 shown in Fig. 3. This is located at the universal joint end of the transmission 111 and replaces the ordinary end cap adjustment of the transmission countershaft which is fairly closely located to the longitudinal centre of the vehicle and the centre line of the transmission. Bracket 190 has an extension located between the rubber blocks 190 and 192. The latter is located between the frame cross member 35 and bracket 190. The former extends between bracket 190 and a washer under the head of bolt 193 which passes through blocks 191 and 192, bracket 190 and cross member 35. The desired resiliency of blocks 191 and 192 is obtained by the extent of their compression by bolt 193, which compression is made sufficient to snub incipient rotational tendencies of the power plant when a rocking action is instituted. The power plant suspension system, while of a three point type, is essentially a two point mounting except when extraneous forces bring the third point into effect. Since all points are of rubber, any distortion between the frame rails 1 and 2 and between which the cross member 35 is mounted, the rubber compensates for any misalignment as well as forming a noise insulating medium between the power plant and the frame base. Cross member 35 is bolted to main rails 1 and 2 so that it can be removed when it is desirable to take out the transmission 111 and leave the remainder of the power plant in position.

In Figs. 1 and 3 it will be noted that the frame cross member 10 extends slightly below transmission 111 in order to clear same when it is removed. In extending outwardly from the centre it is curved upwardly to contact with the under side of rails 1 and 2, thereby tying them together in addition to cross member 35. They extend outwardly to form a rear support for the base of the body structure 201 and 202. The front of the seat box 101 is extended down to the level of the rails 1 and 2 in order to give structural stability at this point. Angle irons 205 and 206 also brace the frame structure and are welded to the cross angle 207 in Fig. 3, which supports plate 97 which is a continuation of the flooring 96. Plate 97 is used in order to give clearance for the control head 210 of transmission 111.

Figure 7:
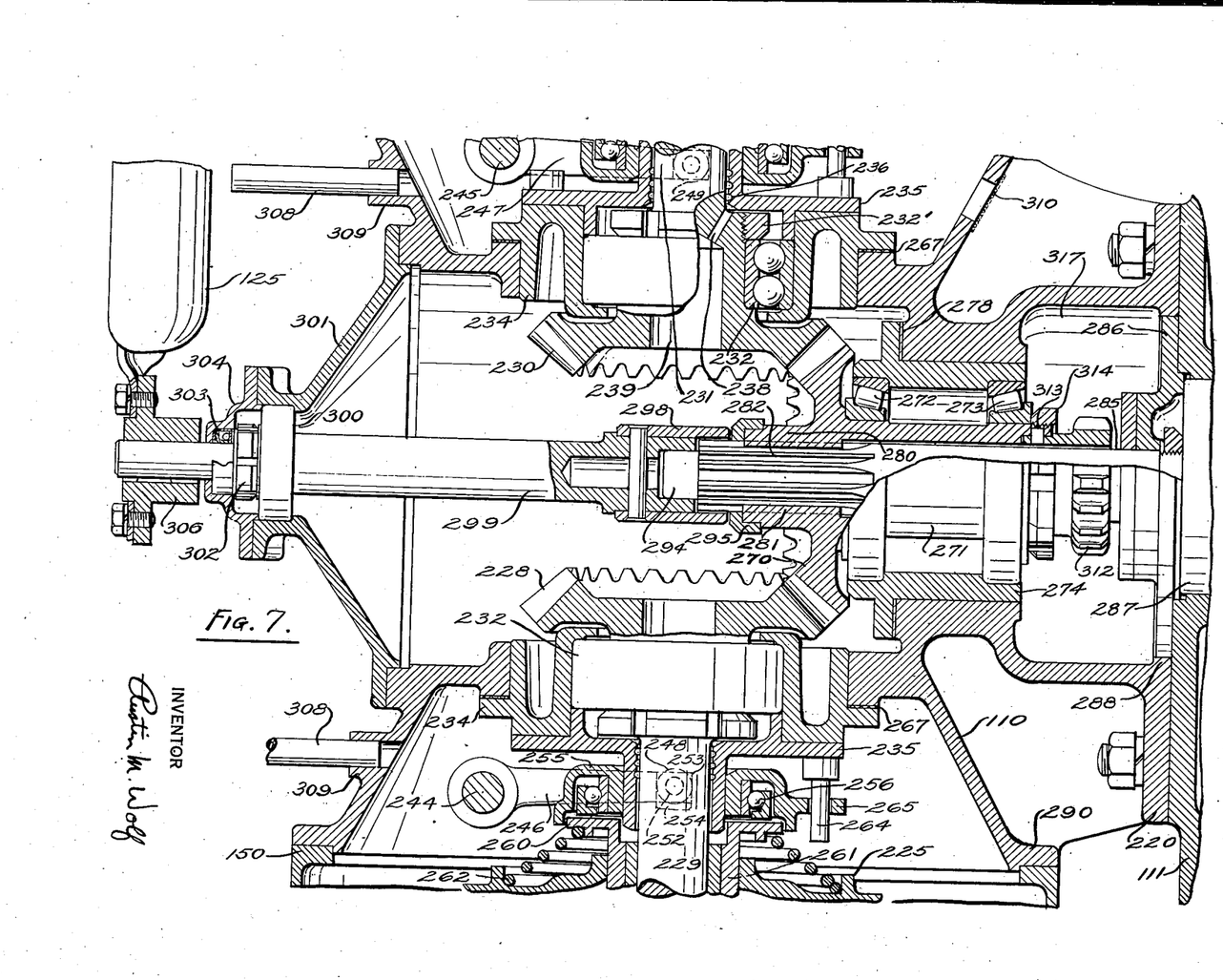
Fig. 7 is a sectional view of the transfer case showing the general disposition of the gearing, accessory drives, engine and transmission mountings and a portion of the clutch operating mechanism. This view also illustrates my proposed ventilating system of the clutch compartment.

The horizontal section through the transfer case is shown in Fig. 7. The bell-housing 150 of engine 105 appears in the lower portion of the view. Bell-housing 151 of engine 106, not shown, is symmetrically located at the other side of the longitudinal centre line. Within the transfer case 110 is located the gearing whereby the power output of the two engines is delivered to the transmission 111 which bolts against the flange 220 of the transfer case 110 being held thereto by means of the studs shown. A conventional clutch 225 is mounted in the flywheel within bell housing 150 and a similar clutch mechanism is incorporated in the opposite engine. A bevel gear 228 is integral with the clutch shaft 229. The corresponding gear 230 is also integral with the clutch shaft 231. Referring to the latter unit, it will be seen that it is mounted in a large double row ball-bearing 232 which is located between a shoulder and gear 230 and the lock nut 232'. This bearing is nested in the carrier 234 and prevented from end movement by a shoulder within same and the clutch throw-out sleeve member 235. The end surface of the sleeve extension is provided with a threaded section 236 which will return through holes 238 any oil that might seep through and by the bearing 232. Only one oil hole 238 is shown; whereas three are actually used and they empty into the counterbore 239; thence the oil returns to the sump 241 in Fig. 3.

Vertical clutch throw-out shafts 244 and 245 are provided to actuate each clutch independently. Keyed to these shafts are the yokes 246 and 247 which terminate in the bosses 248 and 249 respectively. It is of course understood that a similar arm extends above the shaft centre as well as the arm shown below in Fig. 8. Within the bosses 248 and 249 are mounted a swiveling member 252, which is shown in the lower yoke in the view, the upper yoke receiving a like member. The swiveling member 252 has a square portion 253 which abuts a lug 254 on the throw-out cage 255. The lug 254 receives the necessary thrust to throw out the clutch when the yoke 246 is moved in a clockwise direction of rotation. The other clutch is thrown out in similar fashion when the yoke 247 is moved in a counterclockwise rotation. Within the cage 255 is located the antifriction throw-out bearing 256. The outer race of this bearing normally clears flange 260 of the clutch throw-out sleeve 261 when the clutch is in the engaged position. When it is desired to throw out the clutch, the outer race of bearing 256 contacts with the flange 260 and further movement of yoke 246 compresses the clutch spring 262. The operation of the clutch conforms to standard practice.

The throw-out sleeve member 235 is bolted to the bearing carrier 234 by a series of cap screws one of which has a projection 264 which prevents drifting or rotation of the cage 255 by means of lug 265 on the latter encompassing the projection 264.

The gear 228, its bearing, carrier, and the clutch sleeve form a unit which is assembled before inserting into the transfer case 110. Proper positioning of this unit is made possible by means of a laminated shim or a series of shims 267. It will be apparent that the outside diameter of the centralizing cylindrical portion of carrier 234 in case 110 is slightly larger than the maximum diameter of gear 228 in order to permit of assembly or disassembly of the entire unit.

Gears 228 and 230 mesh with the gear 270 which has a sleeve extension 271 which is in turn supported by the anti-friction bearings 272 and 273. The latter are mounted within the carrier 274. The latter is guided within a cylindrical section of case 110 and proper meshing of gear 270 with gears 228 and 230 is obtainable by means of shims 278. Within the sleeve portion 280 which projects toward the cone centre of the gear and also within the web portion of the gear, there are machined the internal splines 281 which fit the external splines 282 of the clutch shaft 285 of transmission 111. The shaft 285 is a standard clutch shaft of a transmission used for unit power plant mounting in which case the splines 282 would receive the splined clutch driven hub. In my invention the design of the various parts is such that a standard transmission is used without resorting to any special parts or machined fits. For ordinary unit power plant use the transmission 111 is bolted to the clutch housing interposed between the transmission and the bell-housing of the engine. In my case the flange 220 of transfer case 110 is so located and machined as to take the transmission 111 and to position the splines 282 in order that the power transmitted to gear 270 can be transferred to the standard shaft 285 and thence into the transmission in the usual way. The end cap 286 of transmission 111 retains the constant mesh gear bearing 287 in place and also centers the transmission clutch shaft by piloting within the machined flange 288 of the transfer case. The bolt holes that are normally in the end wall of the regular clutch housing are located in flange 220 so that the retention and mounting of transmission 111 is the same as the normal incorporation of transmission 111 in the conventional unit power plant. It would be apparent that with the standard clutch shaft 285 in various capacity transmissions and with the standard mounting flange 220 that various transmissions can be bolted to the case 110. Various engines can also be bolted to the bell-housings 150 and 151 if they are kept to standard dimensions. The customary clutch housing flange in the ordinary unit power plant has its counterpart in the flange 290 of case 110.

The clutch shaft 285 is provided at the left extremity with the extension or pilot 284 which in the conventional unit power plant is piloted in the clutch throw-out bearing within the engine flywheel. The shaft 285 is thus centered by the pilot 294 and the bearing 287 in the transmission case. In order to maintain shaft 285 in its proper centralized position and not depend upon the fit of splines 181 and 182 for this purpose, since there is a clearance fit between them, the centering member 295 is pressed on the hub 280 and its internally ground hole fits on the outside diameter of splines 282. The seat for the centering member 295 is machined on hub 280 at the same time that the faces on sleeve 271 are machined for the bearings 272 and 273, thereby establishing concentricity of all these members as well as the gear itself. Whereas splines 281 and 282 have a sliding fit, it would be possible to make them a permanent fit, but this would prevent ready insertion of shaft 285 or its removal with the transmission 111 when the latter is taken out in servicing. Furthermore, more precise concentric relationship can be obtained by the method shown than by counting upon the proper splined fit.

A further advantage is taken of the splines 282 by designing the various parts so that they will project beyond the centralizing member 295 as shown. This is furthermore necessary since the hub 280 cannot extend any more to the left than is permissible in the machining of the teeth of the gear in order that the hub 280 remain within the base cone angle in order to provide clearance of the gear generating machinery. The projecting portions of splines 282 mate with the internal splined portion of hub 298 which is mounted on the fan drive shaft 299. The right end of the latter is machined out to accurately fit over the pilot 294. This fit assures running concentricity of the right end of shaft 299. The left end thereof is supported in the anti-friction bearing 300 which is housed within the transfer case cover 301. The lock nut 302 holds bearing 300 against a shoulder on shaft 299. The seal 303 within the end cap 304 prevents leakage of lubricant from the transfer case 110. Fan 125 is mounted on shaft 299 through the intermediary of the hub 306.

It will be apparent that in assembling the gearing, the gear 270, its bearings 272 and 273, the carrier 274, shims 278 and the centering member 295 are inserted through the opening provided by the cover 301 and set into place. Thereafter the gear units 228 and 230 are inserted from their respective ends of the transfer case.

In order to provide ample cooling within the clutch housing and thereby dissipate the accumulated heat obtained and stored in the members from the slipping of the clutch plates against the clutch friction surface, I provide an extending tube 308 which is fixed in the base 309 of the transfer case and thus communicates with the interior of the clutch compartment. Tube 308 extends to the left in close proximity to fan 125. The latter blows air to the left through the radiator core and thereby exerts a suction on tube 308. A screened opening 310 is provided in transfer case 110 or any other desirable part wherein the clutch and flywheel are housed permitting ingress of outside cool air. In order to provide a drive for an air compressor a sprocket 312 is piloted into an internal hole in the right end of sleeve 271. The pin 313, same being one of several used, transmits the necessary driving torque from sleeve 271 to sprocket 312. The locking nut 314 for bearing 273 encompasses pin 313 when the former is in its proper position. To remove sprocket 312, the locking nut 314 is screwed to the right whereby pin 313 is accessible for driving through to the interior of sleeve 271 when the transmission and its clutch shaft 285 have been withdrawn from the interior of sleeve 271. It will be seen that sprocket 312 becomes an additional element in the unit taking in the gear 270, its bearings, carrier and centering device.

The interior of the gear compartment of transfer case 110 is filled with oil so that the bevel gears dip therein, as indicated in Fig. 3. The passageway 316 in Fig. 3 permits the oil in the sump 241 to communicate with chamber 317 of the transfer case 110 providing lubricant for the air compressor driving mechanism, including sprockets and chain.

Figures 8, 9:
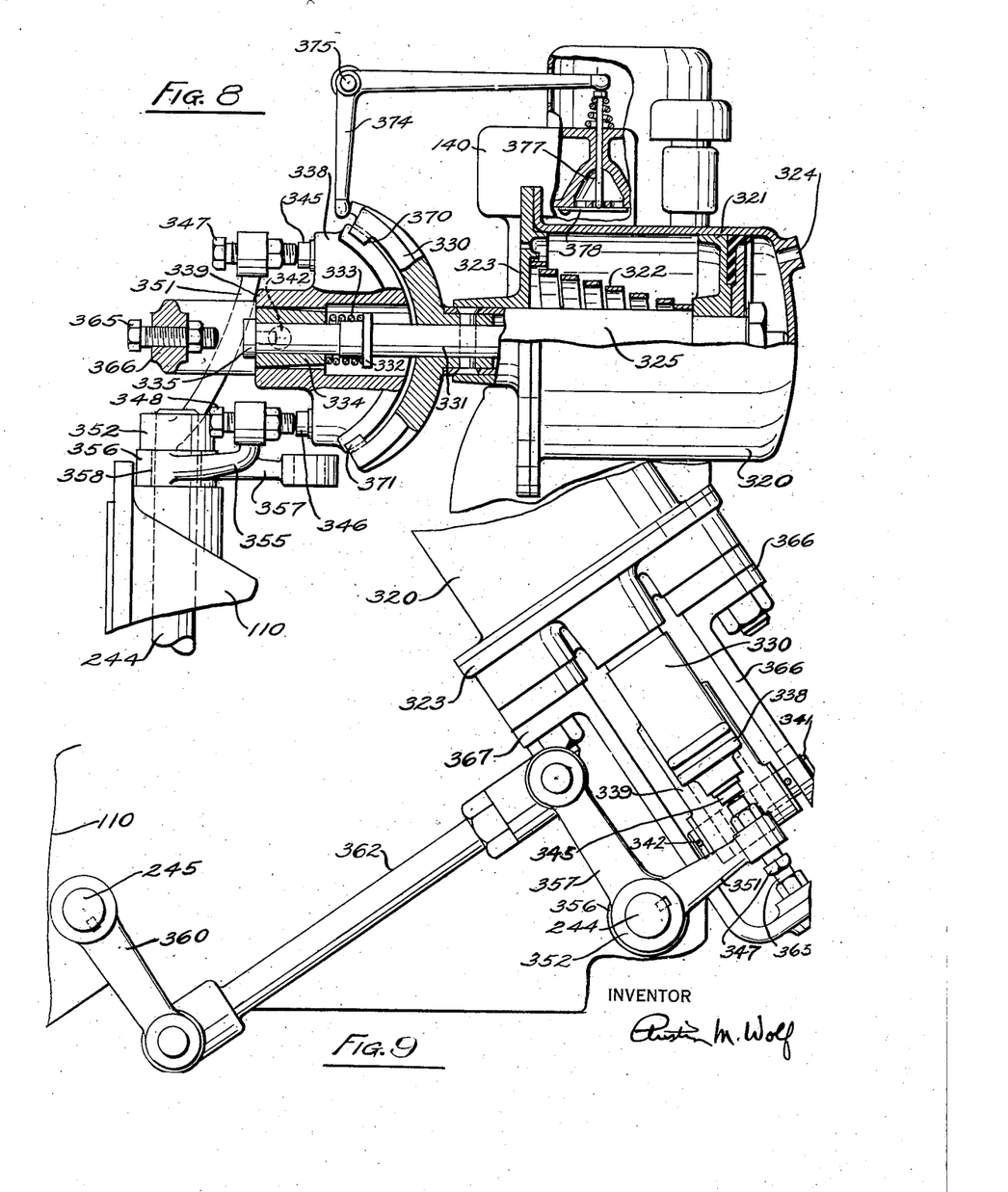
Figs. 8 and 9 show the clutch synchronizing mechanism.

The use of multiple engines requires positive synchronization of the clutches when they engage. While it is theoretically possible to make a manual adjustment, same cannot last since any unequal wear in the clutch facings of one clutch as against the other, will immediately throw the clutches out of step. In my invention I have provided a means to accurately synchronize clutch engagement regardless of manual adjustment or the condition of the clutches themselves or the friction in their operating mechanism. The method pursued is to throw out the clutches at the same instant so that their following engagement must necessarily be simultaneous. While I show clutch actuation by means of fluid pressure, it is also evident that the same principle can be used by the use of mechanical means. In Fig. 1 the brake pedal 61 controls the valve 65. The pipe previously mentioned that conveys compressed air from the reservoir 141 to the brake valve 65 also conveys air to clutch control valve 66, which is actuated by pedal 62. Piping runs from this valve to the clutch actuating cylinder 320 which is mounted on top of transfer case 110 and adjacent compressor 140. Referring to Figs. 8 and 9 it will be noted that a piston 321 is located within the cylinder 320 and normally kept in the position shown by means of the spring 322 which bears against piston 321 at its right end and the end cap 323 on the left. When air is admitted from the valve 66 to the actuating cylinder 320 it enters through the opening 324 and moves piston 321 toward the left, compressing spring 322, while the piston rod 325 moves with it. Secured to the hollow left end of piston rod 325 is secured the shoe 330 and the stem 331. The latter is provided with a shoulder 332 against which abuts the spring 333 which bears against block 334. The latter is a sliding fit on the left end of stem 331 and is prevented from moving beyond the position shown under spring pressure by abutting cap screw head 335. Relative movement of block 334 to the right in relation to stem 331 is permissible by compression of spring 333. The equalizer 338 has a rectangular hub extension 339 which is pivotally mounted on block 334 by means of pins 341 and 342. These pins are anchored in block 334 and terminate as shown in Fig. 9 so as to clear stem 334. The exterior of block 334 is rectangular in cross section but the top and bottom surfaces as shown in Fig. 8 are inclined, the purpose of which will be shortly described.

Equalizer 330 is provided with hardened buttons 345 and 346 which contact during clutch actuation with the rounded ends of set screws 347 and 348. These screws are adjustable and are provided with lock nuts in the customary manner. The former is mounted on the offset lever 351 having the hub 352 which is keyed to the clutch throw-out shaft 294. The screw 348 is mounted in the lever 355 having hub 356 and from which extends lever arm 357, thus forming the bell crank 355—357. The hub 356 is provided with the bushing 358 so that it may freely rotate axially about throw-out shaft 244. A lever 360, in Fig. 9 is keyed to the left throw-out shaft 245 and an adustable rod 362 with the necessary yoke ends, one being fixed and the other adjustable, connects it with lever 357. It will therefore be seen that the clutch throw-out shafts 244 and 245 will be actuated when piston 325 and the equalizer 338 move to the left in Fig. 8. The first movement of piston 325 results first in the take-up of any clearance between button 345 and screw 347 and between button 346 and screw 348. Further movement to the left, due to the pivotal relationship of equalizer 338 on block 334 results in the taking up of the clearance between the outer race of the clutch throw-out bearing 256 and the clutch sleeve 260 in Fig. 7. During this movement, equalizer 338 clears the inside curved surface of shoe 330 due to the pressure of spring 333. The latter is sufficiently strong to overcome any frictional resistance of pivots, shafts and levers up to the point of attempting to actuate the clutch sleeve 260. It will be seen that up to this point the action is completely equalized and that both throw-out bearings come in contact with the clutch throw-out sleeves and are ready to move them at the same instant due to the equalizing action of element 338. Further movement of piston rod 325 to the left causes compression of spring 333, whereby the equalizer 338 is caused to stand still while stem 331 and the equalizer shoe 330 advance to take up the clearance between the latter and equalizer 338, this terminating in their frictional contact. The curved surface of equalizer 338 is machined to the same radius as the inside of shoe 330 insuring intimate contact between them. The reason that equalizer 338 is retarded in its movement is due to the fact that clutch spring 262 of each clutch causes sufficient resistance to make spring 333 compress. This is readily understood when it is mentioned that clutch spring 262 has an approximate pressure of 400 lbs. The compression of the clutch springs 262 is brought about after contact between shoe 330 and equalizer 338, at which time further movement of piston rod 325 to the left causes immediate and equal movement of the clutch sleeves 260. With the frictional contact between shoe 330 and equalizer 338, these two units now act as a solid mass and the equalizing action is cut out. This compels the two clutches to begin their release movement simultaneously after an equalizing adjustment has been made. Since the clutch sleeves 260 are moving in unison up to the full disengagement of the clutch, they will also move simultaneously and in exact synchronism when air is released from cylinder 320 and piston 321 and its piston 325 move to the right. The rigid relationship exists up to the time that the outer races of release bearings 256 are ready to depart from the faces of sleeves 260. Further movement of piston rod 325 to the right permits the shoe 330 to separate from equalizer 338 under the influence of spring 333. The entire assembly will thus assume the position shown in Fig. 8 where it is ready for a further release action. In order to prevent excessive movement of piston 321 so that throw-out bearing 256 be not unduly loaded, a stop screw 365 is located in the stirrup 366 surrounding the equalizer mechanism and attached to cylinder cap 323 by means of feet 366 and 367. In order to prevent rotational movement of the unit, since there is no restraining influence on piston 321, pin 341 of the equalizer hub 339 extends in a slot in stirrup 366. The rotational movement of the shoe 330 is prevented by means of fingers 370 and 371 which act as a side guide on the end of the curved rim of equalizer 338. In this way the entire mechanism is kept in proper alignment.

It is essential that with multiple engines the clutches engage simultaneously. In the above mentioned mechanism it will be noted that regardless of variation and friction of the operating mechanism, the moment of movement of the clutch sleeve 260 is absolutely synchronized. Since the clutches disengage at the same instant and at which time the entire mechanism is locked solid, the clutches must engage simultaneously during the reverse movement of the mechanism. It will be noted that before each disengagement the equalizing mechanism takes "feel" of the two distinct clutch throw-out mechanisms and at the proper time the mechanism is locked solid. In this way every clutch actuation amounts to an individual and distinct adjustment prior to the operation. This is entirely apart from a predetermined mechanism set-up which cannot sense any unusual variations following the initial adjustment. The only possible variation in clutch synchronization taking in both disengagement and engagement would be with a variation in the pressure in the individual clutch springs 262. These springs are manufactured to very close limits and if necessary can be selected so that the variation between them is nil, thus assuring positive synchronization of clutch action. It was noted in reference to Figs. 3 and 7 that the air compressor was driven from sprocket 312 attached to the driven gear sleeve 271. Since this drive occurs between the clutch or clutches and the transmission mechanism, operation of the compressor during the moment of disengaging the clutch or clutches would cause retardation of this immediate mechanism due to the resistance of the compressor. Such slowing up would cause improper gear shifting and in order to overcome such an occurrence a bell crank 374 is pivoted on fulcrum 375, contacting at one end with the shoe 330 and at the opposite end with the stem 377 of compressor 140. The lower end of the latter just clears the inlet valve 378, same being shown as of the spring or disc type. In order to prevent the compressor 140 from operating during clutch actuation, movement of piston 321 to the left will cause depression of stem 377 and thus hold open valve 378 preventing the compressor from functioning but merely idling over under atmospheric pressure with the inertia or flywheel effect of its parts and drive as well as that of fan 125 and its drive. Stem 377 can be made to function with the usual compressor unloader mechanism. If so desired, a set screw can be located at the end of depending arm of bell crank 374 to contact with shoe 330. It is to be noted that the latter moves in conjunction with piston 321 for each clutch actuation. While I have shown a fluid operating mechanism to actuate the rod 325, it will be readily understood that same can be mechanically actuated from the clutch pedal 62 in Fig. 1, if so desired.

Figure 10:
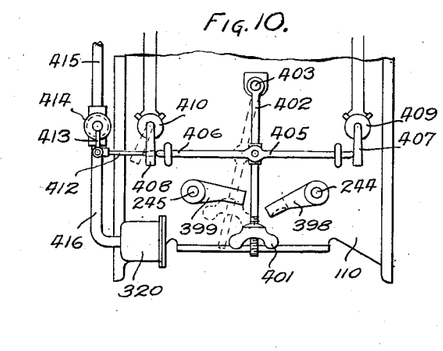
Fig. 10 is a plan view illustrating mechanism for locking out one of the clutches and rendering one prime mover or motor inoperative.

I propose to latch out either one of the two engines and a means of so doing is accomplished in Fig. 10. It will be noted that the clutch throw-out shafts 244 and 245 extend through the bottom of the transfer case 110 as indicated in Fig. 3 and shown diagrammatically in Fig. 10. To the shafts are affixed the levers 398 and 399 having a forked end and a spherical depression into which can be fitted a spherical base of wing nut 401 on the rod 402 which is pivoted below the transfer case on fulcrum 403. The left clutch is diagrammatically shown latched out. This operation is performed by throwing out the clutches which causes clockwise rotation on lever 398 and counterclockwise rotation on lever 399. With the clutches so set, the rod 402 is swung to the left and wing nut 401 run-up on the rod until its spherical end seats in the spherical cavity of lever 399. The left clutch is then held in the disengaged position by yoke 247 of Fig. 7 and gear 230 will rotate idly as will the clutch disc in driving connection with the end thereof. The clutch plate having been released and being held there, there is no frictional engagement of the clutch. Similar operation can be made upon the right clutch by means of holding lever 398 in a disengaged position.

When one of the clutches is latched out, the equalizing mechanism will be affected unless special provisions are taken care of so that the actuation of the working clutch will be normal. This can be accomplished by locking equalizer 338 in Fig. 8 when one of the clutches is latched out. In order to avoid the use of extra parts, the construction shown has been evolved to automatically take care of such a situation. It will be noted that block 334 has a tapered top and bottom surface. The hole in the hub 339 of equalizer 338 is rectangular in shape and its height is slightly greater than the greatest vertical thickness of block 334 so that the rocking of equalizer 338 about pins 341 and 342 be unimpeded. For the purpose of explanation, let it be considered that lever 351 has been moved to the left in Fig. 8 through the locking out of the clutch controlled by clutch shaft 244. Movement of piston 321 to the left for actuation of the sole working clutch would cause counterclockwise rotation of equalizer 338 as it advances with stem 331. This is due to contact of button 346 against screw 374. This movement is, however, only slight, since the bottom surface of the rectangular hole in hub 399 will contact with the bottom tapered surface of block 334. At this point the equalizer 338 can rock no further and to all intent is a solid unit in the entire assembly. Lever 355 and clutch shaft 245 are now actuated upon further movement of piston 321.

The operation in the case of the latching out of the other engine would following in similar fashion as explained above excepting that equalizer 338 would be imparted a slight rotation in a clockwise direction when button 345 first contacts with screw 347, screw 348 being out of operating distance at this time.

The frictional contact established between equalizer 338 and shoe 330 will depend upon the area and the materials of the contacting surfaces. Naturally, they are made sufficient to prevent rotation of equalizer 338 when the clutches are being actuated, in disengagement or engagement. The forces of the clutch springs 262 and the leverages involved from either clutch throw-out shaft (both being preferably alike) to the pivotal axis of pins 341 and 342 and including the radius of the frictional contacting surfaces on 330 and 338, are all taken into account so that the frictional grip of the relating members will not be impaired. It is desirable to use relatively soft metallic surfaces such as bronze for shoe 330 and an aluminum alloy for equalizer 338. It will be readily seen that other variations are possible in the utilization of soft metal such as lead with another metal. It is even possible to line one of the curved surfaces with a material similar to brake lining or one possessing resiliency such as a rubber compound. Furthermore, it is possible to change the physical surface of shoe 330 and equalizer 338 by means of rough machining or by the machining of small serrations in each surface which will interlock with each other upon contact.

The rod 402 has linked to it the rods 405 and 406 which are attached to the arms 407 and 408 of switches 409 and 410 respectively. These switches are of the rotary type and the wires running to their binding posts put them in series with the primary circuit of the ignition system. When the rod 402 is in the middle position at which time both clutches are engaged and both engines running, the primary circuit of the ignition system for each engine is completed. When rod 402 has been swung to the left as indicated diagrammatically, switch 410 breaks the primary circuit for the engine on that side of the vehicle, while switch 409 maintains the circuit intact for the right engine. Conversely, if rod 402 is swung to the right in the position for latching out clutch shaft 244, switch 409 breaks the contact in the primary circuit for the right engine and maintains it in switch 410 for the left engine. Link 412 extends to the left from rod 406 and is secured to the lever 413 of the air valve 414. In the neutral position shown, air entering pipe 415 passes through the barrel of valve 414 without restriction and enters pipe 416 to be conveyed to the clutch control cylinder 320. When rod 402 is swung either to the right or left to cut out an engine, the barrel of valve 414 is rotated axially and therefore its through-passage restricts the flow through the inlet and outlet ports of valve 414 cutting down the effective area of the valve capacity. This throttling effect will then reduce the pressure in cylinder 320 for clutch actuation when only one engine is running. The clutch spring pressure is in the neighborhood of 400 lbs; same has only to be overcome when one engine is used, as compared to 800 lbs. when both engines are in action.

From the above description it will be seen that I have provided a very simple and compact arrangement of the motor transmission and clutch together with a compressor or other accessory and means whereby the accessory is operatively disconnected during clutch operation so as to relieve the clutch operating mechanism of the resistance of the compressor. This is a very desirable feature, particularly in connection with the operation of dual powered motor buses. Further it will be seen that I provide a very efficient cooling system in which cooling blasts of air are circulated longitudinally over the motors or prime movers in addition to the circulation of air through the water cooling radiator. By providing a common transmission mechanism for the two prime movers, with said mechanism and a coupling between the radiator fan and the power input shaft enclosed within a common housing, as shown in Fig. 7, I have materially simplified and increased the efficient and reliable operation of mechanism of this character as heretofore used in the art.

In the foregoing description and the accompanying drawings I have disclosed mechanical embodiments of my present improvements, which are believed to exemplify the most practical means for accomplishing the ends in view. Nevertheless it is of course to be understood that the essential features of the invention might also be incorporated in various other alternative mechanical structures and I accordingly reserve the privilege of resorting to all such variations and modifications in the form, construction and relative arrangement of the several cooperating elements as may fairly be considered to be within the spirit and scope of the appended claims.

What I claim is:

1. In a vehicle, a prime mover to propel same, a transmission, a clutch between said prime mover and said transmission, clutch operating means, accessory driving mechanism between said clutch and transmission, an accessory driven thereby, an interconnecting element between said clutch operating means and said accessory, and means for interrupting the operation of said accessory during clutch operation through said interconnecting element.

2. In a vehicle, a pair of prime movers located transversely at an extremity of the vehicle, clutches for said prime movers, means for operating one or both of said clutches, means for locking out either one of said clutches, a central transfer case, a transmission attached to said transfer case, a driving axle, and power transmitting mechanism between said transmission and said driving axle.

3. In combination, a prime mover, a transmission, a clutch between said prime mover and transmission, clutch operating means, an accessory, having a driving correction between said clutch and transmission and means actuated by said clutch operating means to render said accessory functionally ineffective during clutch operation.

4. In combination, a prime mover, a transmission, a clutch between said prime mover and transmission, an accessory having a driving connection between the clutch and transmission, clutch operating means, and means responsive to clutch operation for rendering said accessory functionally ineffective.

5. In combination, a prime mover having a crank-shaft, a cooling system including a radiator positioned in parallel relation to said crank-shaft, a fan associated with said radiator and having a driving connection with one end of said crank-shaft, and a second fan having a driving connection with the other end of said crank-shaft and positioned in a plane at substantially right angles thereto, to create a circulation of air longitudinally of the prime mover.

6. In combination, a pair of prime movers, a common radiator therefor, power transfer gearing, a shaft driven thereby, a common housing for said gearing and shaft, and a fan directly connected to and driven by said shaft for circulating air through said radiator.

7. In combination, a pair of prime movers arranged in alignment and each having a crank-shaft, a common radiator for said prime movers positioned in parallel relation to said crank-shafts and laterally spaced therefrom, power transfer gearing between the prime movers and means for connecting said gearing with the crank-shafts, and a fan driven by said gearing for circulating air through said radiator.

8. In combination, a pair of prime movers, a common radiator therefor, an air circulating fan associated with said radiator, and driving means for said fan operatively connected with each of said prime movers.

9. In combination, a pair of prime movers, a common radiator therefor, an air circulating fan associated with said radiator, a driving shaft for said fan, power transmission means common to both prime movers, including a single power input shaft, and coupling means between one end of said shaft and the fan driving shaft.

AUSTIN M. WOLF.